Sept. 9, 1924.                                            1,507,954
E. M. COLE
LIFTING MECHANISM FOR MOLDING APPARATUS
Filed May 12, 1922           6 Sheets-Sheet 1

Sept. 9, 1924.

E. M. COLE 1,507,954

LIFTING MECHANISM FOR MOLDING APPARATUS

Filed May 12, 1922     6 Sheets-Sheet 2

Inventor
Eugene M. Cole
By J. Hanson Boyden
Attorney

Sept. 9, 1924.

E. M. COLE 1,507,954

LIFTING MECHANISM FOR MOLDING APPARATUS

Filed May 12, 1922   6 Sheets-Sheet 4

FIG. 4.

Inventor
Eugene M. Cole,
By J. Hanson Boyden
Attorney

Sept. 9, 1924.  
E. M. COLE  
1,507,954  
LIFTING MECHANISM FOR MOLDING APPARATUS  
Filed May 12, 1922  
6 Sheets-Sheet 6

Inventor  
Eugene M. Cole,  
By J. Hanson Boyden,  
Attorney.

Patented Sept. 9, 1924.

1,507,954

UNITED STATES PATENT OFFICE.

EUGENE MACON COLE, OF CHARLOTTE, NORTH CAROLINA.

LIFTING MECHANISM FOR MOLDING APPARATUS.

Application filed May 12, 1922. Serial No. 560,464.

*To all whom it may concern:*

Be it known that I, EUGENE M. COLE, a citizen of the United States, residing at Charlotte, in the county of Mecklenburg and State of North Carolina, have invented certain new and useful Improvements in Lifting Mechanism for Molding Apparatus, of which the following is a specification.

This invention relates generally to the art of molding or metal founding, and more specifically to means for withdrawing patterns from mold flasks.

In the casting of small metal articles such as machine parts, it is the common practice to employ a mold flask comprising separable top and bottom sections known as the cope and drag, respectively, between which sections is interposed a pattern plate carrying on each side one-half of the desired pattern. The drag and cope are assembled with the pattern plate between them so as to make complementary impressions in the sand carried by the respective flask sections, and the cope is then lifted from the drag so that the pattern plate may be removed, whereupon the cope is replaced upon the drag, thus causing the impressions of the pattern in the two sections of the flask to register and form complete mold cavities into which the molten metal is poured.

The manipulation of the cope and pattern plate as above described has heretofore been done by hand, and great difficulty has been experienced in practice in lifting these parts by a true rectilinear movement while maintaining them parallel so as to properly withdraw the pattern from the sand. It frequently happens that the cope or the pattern plate is slightly tilted when being removed, with the result that the edges of the sand impression are broken or deformed, thus producing imperfect castings.

The general object of the present invention is to provide mechanism which will accurately elevate the cope and pattern plate by a true rectilinear movement and strictly maintain them parallel during such movement, so that the pattern is properly withdrawn from the sand, leaving a perfect impression. A more specific object is to provide mechanism of this character which will operate to successively lift the cope from the pattern plate and then lift the pattern plate from the drag and maintain such parts in spaced parallel relation. A further object is to accomplish the above results by means of the continued rotation of an operating shaft in the same direction.

Another and still more specific object of the invention is to provide mechanism comprising a group of arms located at each side of the flask and comprising means whereby said groups of arms may be first swung horizontally into position to engage the cope and pattern plate and then simultaneously elevated so as to successively lift the cope and pattern plate as described.

With the above and other objects in view, and to produce a comparatively simple, efficient, and positively acting device of the character stated, the invention consists in the construction, arrangement and combination of parts hereinafter described and claimed, and illustrated in the accompanying drawings, in which:

Figure 4 is a view similar to Figure 3, but showing the mechanism in a position corresponding with that of Figure 1, in which the lifting arms have been swung into operative position;

Figure 1:
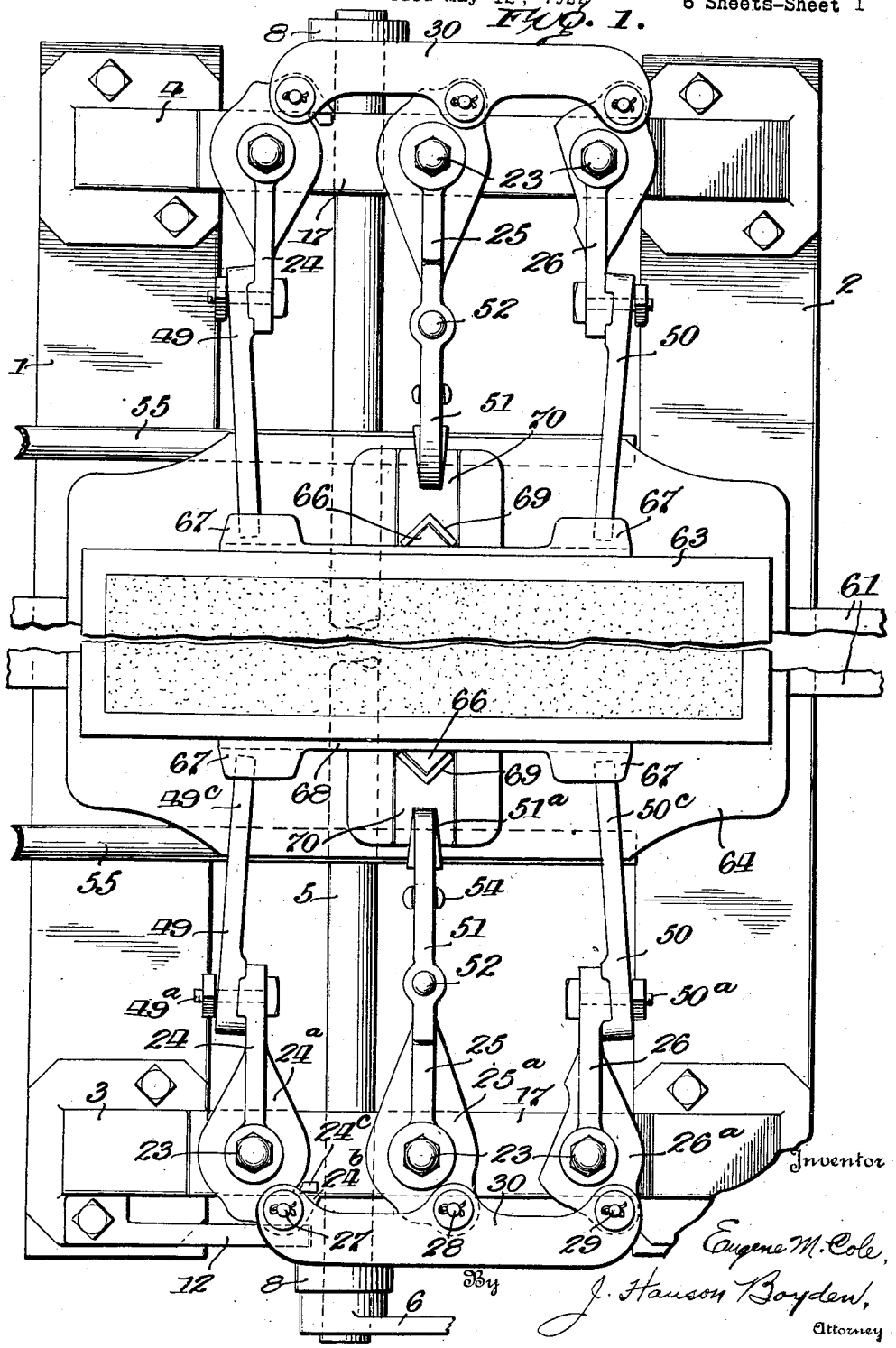
Figure 1 is a plan view of my improved mold operating mechanism complete, such mechanism being shown in engagement with a mold flask, parts being broken away.

Referring to the drawings in detail, the flask and operating mechanism therefor are mounted on a suitable support comprising parallel sills or beams 1, 2. Secured to each end of these beams and spaced far enough apart to permit the free insertion of a flask between them, are a pair of end frames, 3, 4, preferably formed of cast metal and of trapezoidal shape, as clearly shown in the drawing. Journaled in bearings $3^c$ depending from the bottom of the end frames, is an operating rock shaft 5 which extends parallel to the beams 1, 2, and is located between them. To one end of this rock shaft 5 is secured an operating lever 6, as by means of a set screw 7.

My improved mechanism comprises two groups of elements disposed one at each side of the flask and simultaneously operated by means of the rock shaft 5. These groups of elements are identical and a description of one will suffice for both.

Secured to each end of the rock shaft 5, just outside of the respective end frames 3 and 4, is a collar 8 held by a set screw 9 and carrying a radial arm 10, one of the collars 8 being mounted adjacent the lever 6. The arm 10 has in one edge thereof a notch 11 adapted to engage the end of a fixed stop 12 secured to the end frame 3 in order to limit the rotation of the shaft 5 and associated parts, as clearly shown in Figure 5.

Figure 3:
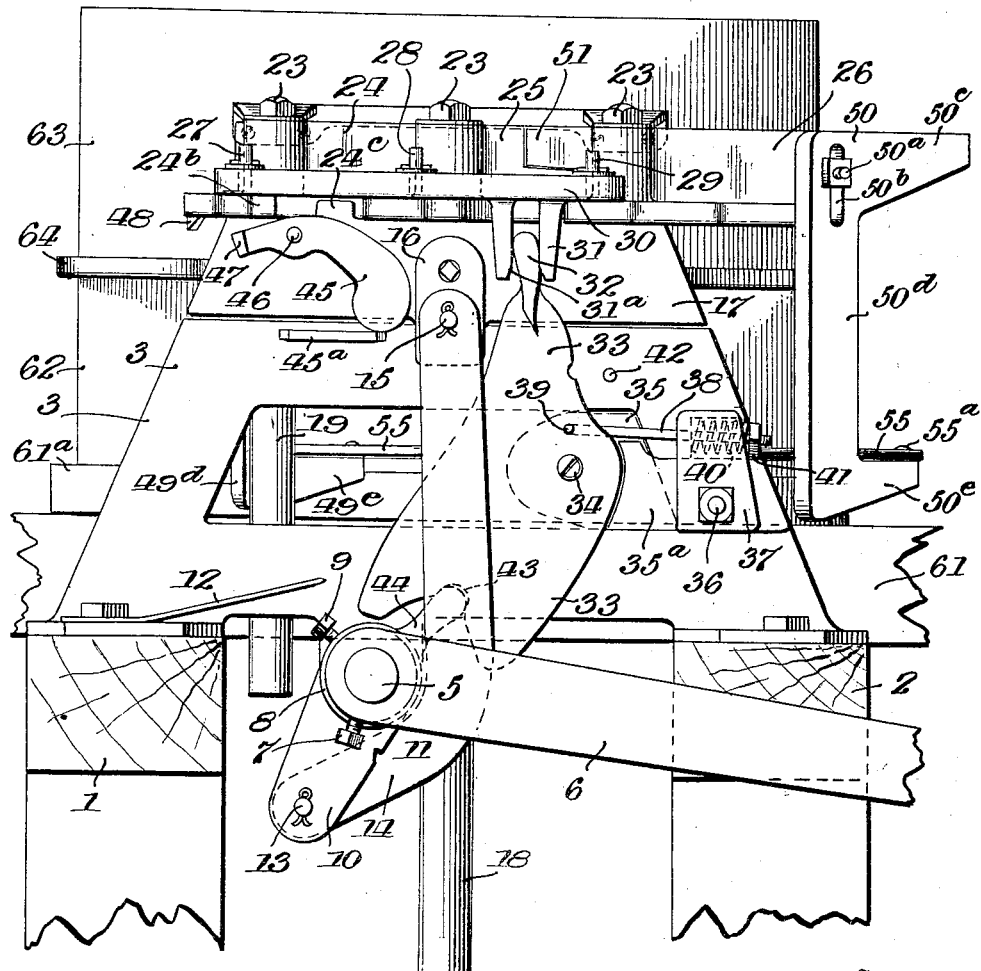
Figure 3 is an end elevation of the mechanism as it appears when in its idle or inoperative position, a flask also being shown.
Figure 5:
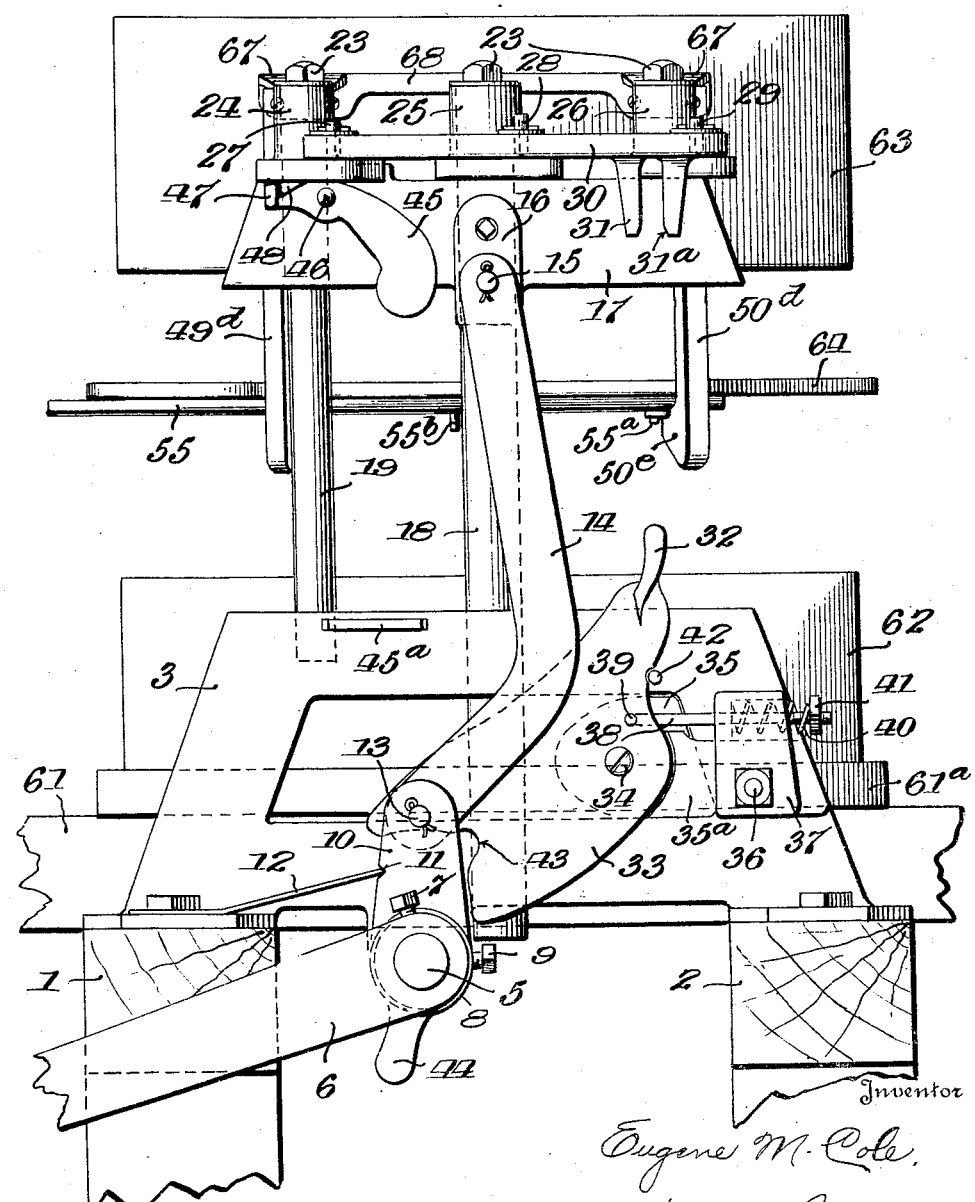
Figure 5 is a view similar to Figure 3 and 4, but showing the parts in a position corresponding to that of Figure 2, in which the cope and pattern plate are elevated.

Pivotally connected to the arm 10, as by a pin 13, is one end of a link or connecting rod 14 bent laterally, as shown in Figures 3, 4 and 5, and the upper end of this link is pivotally connected, as by means of a pin 15, to a lug 16 secured to a movable cross head 17.

This cross head 17 is mounted for vertical movement and has secured thereto a plurality of vertical guide rods 18, 19 (two of such rods being shown), these rods sliding through alined openings formed in top and bottom flanges $3^a$ and $3^b$ of the end frame 3. In order to lessen the friction the main or central guide rod 18 is provided with a friction roller 20 mounted between brackets 21 carried by a plate 22 secured to the upper flange $3^a$ of the end frame.

Pivotally mounted on studs 23 set into the top of the cross head 17 and constructed to swing in a horizontal plane, are three levers 24, 25 and 26, provided with base flanges $24^a$, $25^a$ and $26^a$, respectively. Pivot pins 27, 28 and 29 connect these base flanges respectively with a coupling bar 30, whereby all of said levers 24, 25 and 26 are caused to swing in unison. A stop lug $24^c$ carried by the cross head 17 is so disposed as to be engaged by a finger $24^b$ carried by the base flange $24^a$ of the lever to limit the swinging movement of the several levers and to arrest such movement when the position shown in Figure 1 is reached.

Depending from the lower side of the coupling bar or actuating member 30 are a pair of spaced lugs 31, the inner lower corners of which are preferably beveled, as shown at $31^a$, and adapted to receive between them a rounded lug or finger 32 carried by a lever 33, preferably in the form of a flat plate, and pivoted at 34 to a block 35. This block has a portion which fits within an opening formed in the end frame 3, as clearly shown in Figures 3, 4, 5 and 6, and also has a portion $35^a$ which projects beyond the front face of the end frame 3 and is adjustably secured to said frame by means of a bolt 36. This bolt also passes through a block 37 which overlies the portion $35^a$, and in the upper portion of which is slidably mounted a rod 38 having at its end a hook portion 39 which is pivotally engaged with the lever 33. Seated in a socket in the block 37 and surrounding the rod 38 is a spring 40 which bears at its free end against a nut 41 secured to the rod 38 in such manner that said rod is yieldingly urged toward the right. The result of this is that when the lever 33 is disengaged from the lugs 31, as hereinafter described, such lever is caused by the spring 40 and rod 38 to move over into the position shown in Figure 5, in which position it is held by engagement with a stop pin 42.

Also carried by the collar 8 is a radial lug 44, the rounded end of which is adapted to engage in a U-shaped notch 43 formed in the lower edge of the lever 33, when the rock shaft 5 occupies certain angular positions. Thus in Figure 3 the lug and notch are shown in engagement. In Figure 4 they are just becoming disengaged, and in Figure 5 they are widely separated.

In order to hold the levers 24, 25 and 26 in the position shown in Figure 1 after they have been swung to such position, I preferably provide locking means comprising a counterweighted latch 45, pivoted at 46 to the cross head 17 and having an out-turned end 47 adapted to engage a beveled lug 48 carried by the under-side of the base flange $24^a$, as shown best in Figure 5. It will be understood that as the levers 24, 25 and 26 are swung from the position shown in Figures 3 or 7 into that shown in Figures 1 and 5, the beveled lug 48 rides over the end 47 of the counterweighted latch 45 and engages the same. After being thus engaged, the latch and lug remain in engagement, locking the levers 24, 25 and 26 against angular movement until the cross head is again lowered. When it is lowered, the lower end of the latch 45 engages with a lug $45^a$ carried by the end frame and is thus rocked on its pivot 46 so as to release the lug 48, as clearly shown in Figures 3 and 4.

Secured to the levers 24 and 26, as by means of interlocking parts held together by bolts $49^a$ and $50^a$ working through slots $49^b$ and $50^b$, are brackets 49 and 50. These brackets, the shape of which is clearly shown in Figures 2 and 3, comprise a pair of spaced horizontal arms $49^c$, $49^e$, and $50^c$, $50^e$, connected by vertical portions $49^d$ and $50^d$, respectively.

Secured to the lever 25 is an arm or finger 51, the method of attachment preferably being by means of a bolt 52 passing vertically through the parts 25 and 51 which are disposed in overlapping relation, such bolt being surrounded at its lower end by a helical spring 53 (see Figure 6), which yieldingly holds the parts together. In other words, the arm or finger 51 is capable of slight vertical movement relative to the lever 25 and is guided in such movement by a pair of spaced lugs 54 between which the arm or finger 51 lies. The extreme end of the arm or finger 51 is indicated at 51$^a$ and is preferably formed with a beveled under-surface (not shown).

Figure 2:
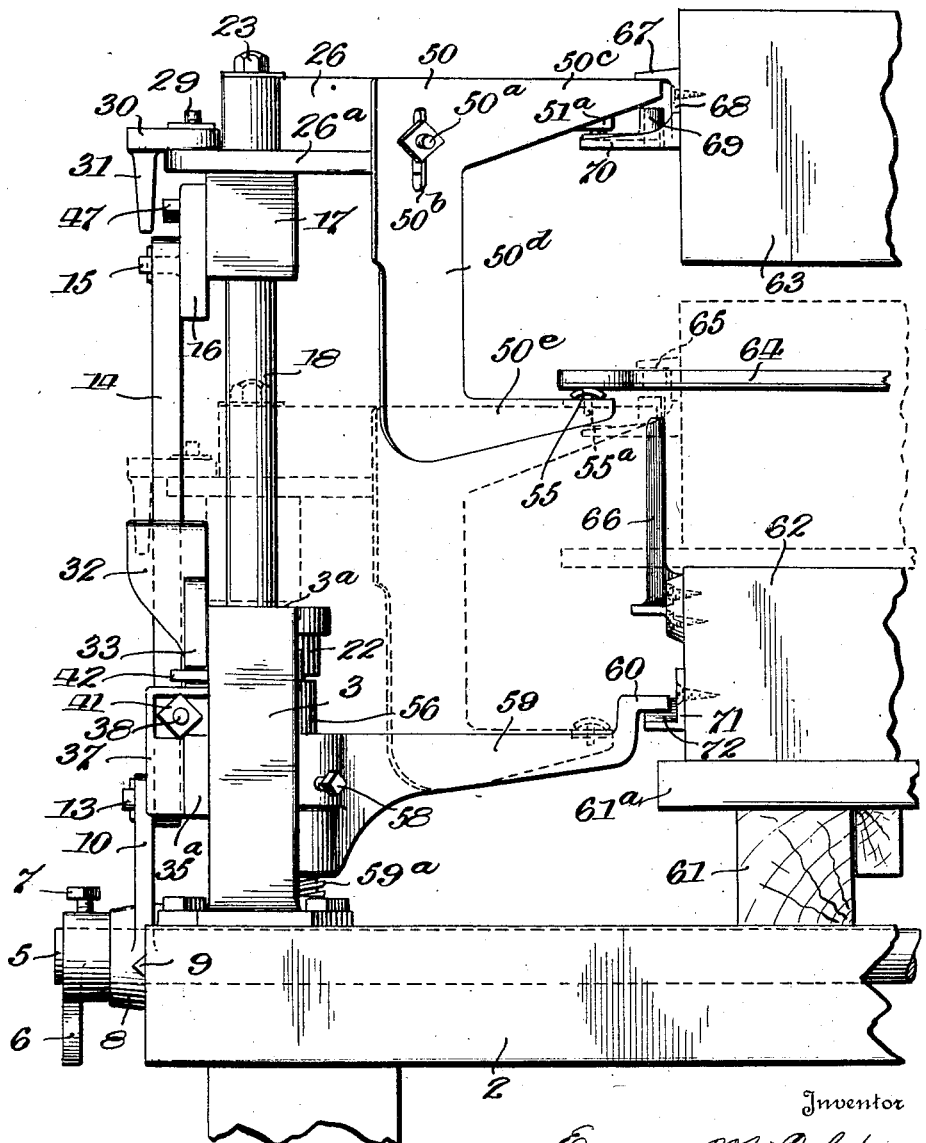
Figure 2 is a side elevation of one-half of the mechanism showing the same in engagement with the cope and pattern plate of a flask, and illustrating such cope and pattern plate as in their elevated position.

Supported upon the lower arms 49$^e$ and 50$^e$ of the brackets 49 and 50 is a slide rail 55, preferably convex on its upper surface, as shown in Figure 2, and secured loosely to the supporting arms by pins 55$^a$.

Figure 6:
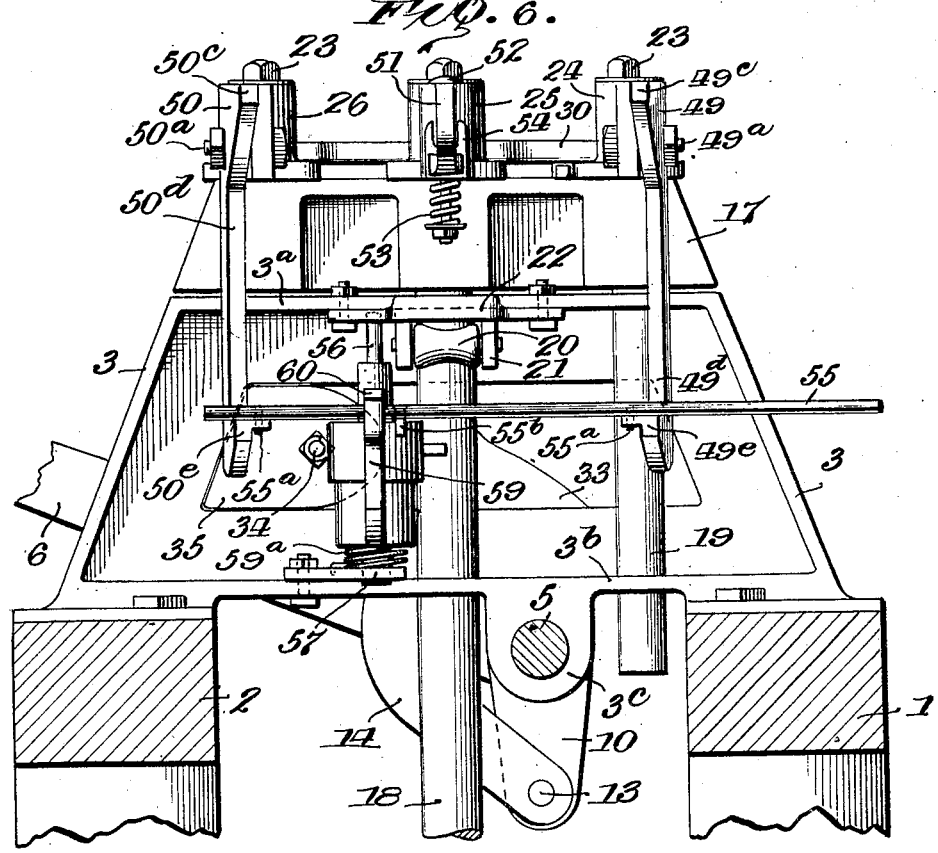
Figure 6 is an inside end elevation of one-half of my improved mechanism showing the parts in a position corresponding to that of Figure 4, parts being illustrated in section.

As shown in Figure 6, a vertical shaft 56 is journaled at its upper end in the plate 22 and at its lower end in a plate or bracket 57 secured to the lower flange 3$^b$ of the end frame, and secured to this shaft, as by means of a set screw 58 (see Figure 2) is a horizontal arm 59 having an offset end 60. The purpose of this will be hereinafter described. The arm 59 is urged toward the position shown in Figures 2 and 6 by means of a spring 59$^a$ coiled around the lower end of the shaft 56, as clearly shown in the drawings.

Supported on the sills or beams 1 and 2, and extending across the same at points between the end frames 3 and 4 of my improved mechanism, are a pair of spaced, parallel, horizontal runaways 61 adapted to receive the flask or mold. As usual, this flask comprises a bottom plate or pallet 61$^a$ on which rests the lower section of the flask 62, commonly known as the drag. The upper section of the flask, known as the cope, is shown at 63, and adapted to be interposed between the cope and drag is the pattern plate 64. This pattern plate has end portions 64$^a$ projecting laterally beyond the sides of the flask proper so as to overlie the slide rails 55 when the same are brought into operative position.

Secured to each side of the drag is a guide post 66, shown as of triangular cross section (see Figure 1), and formed in the plate 64 are holes 65 adapted to register with and fit over the guide posts 66 so as to properly position the plate. Also carried at each side of the cope is a guide member 69 supported by a bracket 70 and adapted to fit over the upper end of the guide post 66 so as to properly position the cope relative to the drag and plate.

Means are provided at each side of the cope which are adapted to be engaged by the swinging arms, as hereinafter described, and such means preferably comprise a plate 68 secured to the cope and carrying a pair of spaced horizontally projecting lugs 67. These lugs are spaced a distance equal to that between the levers 24 and 26, as clearly shown in Figure 1, and are located at such a vertical height as to lie just above the horizontal plane in which the levers 24 and 26 and arms 49$^e$ and 50$^e$ swing.

Secured to each side of the drag at a point on a level with the end 60 of the arm 59, is a bracket 71 having a horizontally projecting portion 72 provided with an inclined upper face, as clearly shown in Figure 2.

The operation of the device as a whole will now be described. Normally the parts occupy the position shown in Figures 3 and 7, with the two groups of arms swung to one side so as to provide ample clearance between them for the reception of the flask. The flask, having been previously filled and rammed in the usual manner, and comprising a pallet, drag, pattern plate and cope, is then placed upon the runways 61 and slid into position between the two groups of arms. The operator grasps the lever 6 and swings it from the position shown in Figure 3 to that illustrated in Figure 4. This slight initial angular movement of the lever 6 and rock shaft 5 serves to swing the levers 33 on their pivots and thus shift the operating bar 30 toward the right, as viewed in Figures 3 and 4. The shifting of this bar in such direction results in swinging the levers 24, 25 and 26 around from the position shown in Figure 7 into that illustrated in Figure 1. In this position, the end 60 of the arm 59 rides up on the inclined surface 72 of the bracket 71, as shown in Figure 2, and snugly engages the same, thus firmly holding the drag 62 down upon the pallet and preventing accidental displacement thereof. Also the arms 49$^e$ and 50$^e$ occupy a position in which they underlie the lugs 67 secured to the cope, being spaced therefrom a relatively short distance. At the same time the arms 49$^e$ and 50$^e$ have brought the slide rails 55 into a position below the projecting ends 64$^a$ of the pattern plate 64 and spaced therefrom a relatively great distance, that is to say, a distance greater than the distance between the arms 49$^e$, 50$^e$, and the brackets 67.

Finally the arm or finger 51 has been brought into firm engagement with the bracket 70, the beveled end 51$^a$ of such arm riding up on to the bracket 70.

Further movement of the operating lever 6 in the same direction from the position shown in Figure 4, brings the connecting rods 14 into action and causes them to progressively elevate the cross heads 17 as movement of the lever 6 continues. As the cross heads 17 move upwardly the arms 49$^e$, 50$^e$, first engage under the brackets 67 opposite sides of the cope 63 and lift it from the pattern plate with a true rectilinear movement. As the cross heads 17 continue to rise, and after the cope has been lifted from the plate a definite distance, the slide rails 55 are brought into engagement with the ends 64ª of the pattern plate, as shown in Figure 2. Further upward movement of the cross heads 17 therefore results in also lifting the pattern plate 64 from the drag, so that during the latter part of the upward movement of the cross heads, the pattern plate and cope are elevated together while maintained in spaced parallel relation.

Figure 7:
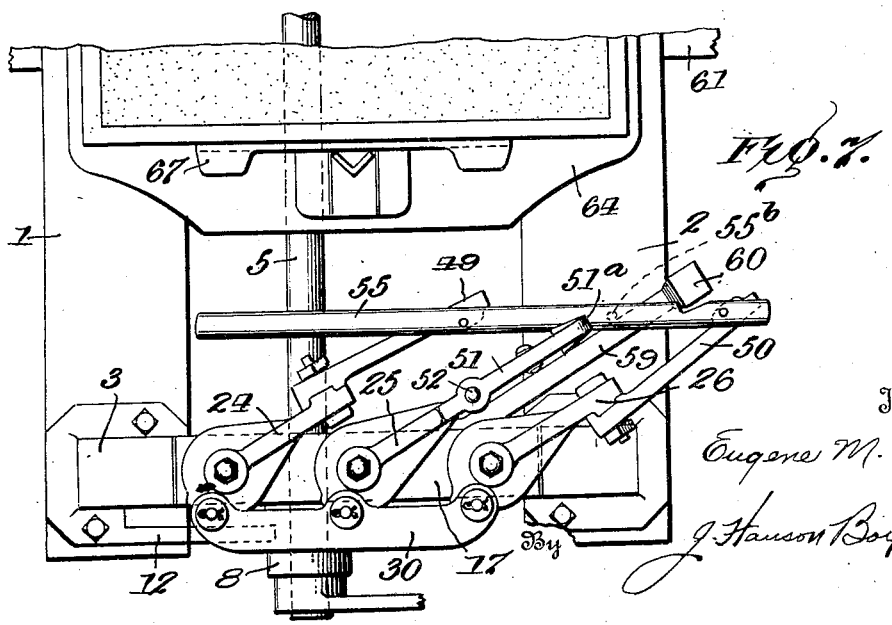
Figure 7 is a fragmentary plan view on a reduced scale showing the appearance of the lifting arms when swung into idle or inoperative position so as to clear the flask.

Movement of the lever 6 is continued until the position shown in Figure 5 is reached, in which position the arm 10 engages with the stop 12, and the thrust of the connecting rod 14 serves to hold the arm 10 in engagement with the stop and to maintain the parts in the position shown in Figures 2 and 5. In this position, as will be readily understood, the pattern plate may be drawn along on the slide rails 55, and thus removed from between the drag and cope. After the pattern plate has been thus removed, the operator moves the lever 6 in the reverse direction, the result being that the cross heads and associated parts, carrying the cope, are lowered. This lowering movement continues until the cope rests upon the drag, the guide members 69 fitting over the guide posts 66. The arrangement is such that the cope and drag engage slightly before the cross heads 17 have reached the lower limit of their travel, with the result that after the cope and drag are in contact, the cross heads move downwardly a little further, this further movement resulting in placing the springs 53 (see Figure 6) under tension, and causing a yielding pressure to be exerted through arms 51 upon the brackets 70, thus firmly forcing the drag and cope into engagement. This occurs when the parts have reached the position about as shown in Figure 4, and in this position it will be noted that the lugs 31 have descended and again straddled the lug or finger 32. Further return movement of the operating lever 6 from the position shown in Figure 4 to that of Figure 3 results in swinging the lever 33 to the left and thus again shifting all of the arms to idle or inoperative position, as shown in Figure 7, in which position ample clearance for the removal of the flask is provided.

It will be noted that during the return movement from the position shown in Figure 4 to that shown in Figure 3, the arm 59 is swung to inoperative position by reason of being engaged by a pin 55ᵇ (see Figure 6) secured to the slide rail 55 and positioned to bear against the side of the lever 59.

It will thus be seen that I have provided means operated by the continued movement of a lever in one direction for causing groups of arms to successively engage and lift the cope and pattern plate of a flask with a true rectilinear movement, and to maintain them in spaced, parallel, elevated position, and it is thought that the many advantages of my improved apparatus will be readily appreciated without further discussion.

While I have shown and described my invention as applied to a flask in which a pattern plate is employed, it is obvious that in its broader aspects the invention is also applicable to a flask having no pattern plate, but in which the pattern is completely enclosed between the cope and drag. With such flasks my improved mechanism will serve to accurately and easily elevate the cope with a true rectilinear movement, so that the pattern may be removed from the drag by hand.

I claim:

1. The combination with a flask comprising the usual drag and cope, of a pair of pivoted arms mounted adjacent thereto, and means for first swinging said arms horizontally into position to engage the cope and then elevating said arms so as to cause them to engage and lift the cope.

2. The combination with a flask comprising the usual drag and cope, of a plurality of pivoted arms mounted adjacent thereto, means for swinging said arms so as to bring one of them into engagement with the drag to hold it down and bring others of said arms into engagement with the cope, and means for then elevating said last mentioned arms so as to lift the cope away from the drag.

3. The combination with a flask comprising the usual drag and cope, of a pair of pivoted arms mounted adjacent thereto, an operating lever, and means actuated by the continued movement of said lever in the same direction for first swinging said arms into position to engage the cope and then elevating said arms so as to lift the cope.

4. The combination with a flask comprising the usual drag and cope, of a pivoted arm mounted adjacent each side of the flask, and means for simultaneously swinging said arms horizontally into engagement with the cope and for then simultaneously elevating said arms.

5. The combination with a flask comprising the usual drag, cope and pattern plate, of means for successively lifting the cope and plate and for maintaining the cope in fixed elevated position while permitting the plate to be removed.

6. The combination with a flask comprising the usual drag, cope and pattern plate, of means for successively lifting the cope and plate, and mechanism brought into operation by said lifting means for holding down the drag.

7. The combination with a flask comprising the usual drag, cope and pattern plate, of means for successively lifting the cope and plate, said lifting means engaging opposite sides of said cope and plate.

8. The combination with a flask comprising the usual drag, cope and pattern plate, of mechanism for first simultaneously engaging and lifting opposite sides of the cope and then simultaneously engaging and lifting opposite sides of the plate.

9. The combination with a flask comprising the usual drag, cope and pattern plate, of an operating lever, mechanism operated by a movement of said lever for successively lifting the cope and plate from the drag, and means whereby a further movement of said lever serves to retain the cope in elevated position while permitting the plate to be removed.

10. The combination with a flask comprising the usual drag, cope and pattern plate, of a pivoted bracket mounted at each side of the flask, means for first swinging said brackets horizontally on their pivots to bring them into operative relation with the flask and then elevating said brackets, and means whereby, when said brackets are elevated, they are caused to successively engage the cope and plate and lift them different distances from the drag.

11. The combination with a flask comprising the usual drag, cope and pattern plate, of a pair of brackets each having two arms, said cope and plate having portions disposed above and at different distances from the respective arms of said brackets, and means for raising said brackets so as to successively bring said arms into engagement with said portions of the cope and plate and thus successively lift them.

12. The combination with a flask comprising the usual drag, cope and pattern plate, of a pair of horizontally swinging brackets each having two arms, said cope and plate having portions disposed above and at different distances from the planes of movements of the respective arms of said swinging brackets, and means for first swinging said brackets so as to bring said arms underneath said portions of the cope and plate and then raising said brackets so as to cause said arms to successively engage and lift the cope and plate.

13. The combination with a base adapted to support a flask comprising the usual drag and cope, of a rock shaft carried by said base, means disposed at each side of the position occupied by the flask to engage the cope thereof, and mechanism operated by said shaft for simultaneously elevating said means and thus lifting the cope.

14. The combination with a base adapted to support a flask comprising the usual drag and cope, of a rock shaft carried by said base, means disposed at each side of the position occupied by the flask to engage the cope thereof, and mechanism operated by said shaft to first cause said means to engage the cope and then simultaneously rise so as to lift the cope.

15. The combination with a base adapted to support a flask comprising the usual drag and cope, of a rock shaft carried by said base, means disposed at each side of the position occupied by the flask to engage the cope thereof, and mechanism operated by continued movement of said shaft in one direction to cause said means to first engage and then lift said cope.

16. The combination with a base adopted to support a flask comprising the usual drag and cope, of a rock shaft carried by said base, means disposed at each side of the position occupied by the flask to engage the cope thereof, and mechanism operated by continued movement of said shaft in one direction to engage and lift said cope and in the other direction to positively move said cope downwardly.

17. The combination with a base adapted to support a flask comprising the usual drag and cope, of a rock shaft carried by said base, pivoted arms on each side of the flask position, and means operated by said rock shaft to first simultaneously swing said arms on their pivots into engagement with said cope and then simultaneously elevate said arms so as to lift the cope.

18. The combination with a base adapted to support a flask comprising the usual drag and cope, of a rock shaft carried by said base, pivoted arms on each side of the flask position, and means operated by the continued movement of said rock shaft in the same direction for first causing said arms to swing into engagement with said cope and then elevating them so as to lift the cope.

19. The combination with a base having runways on to which may be slid a flask comprising the usual drag and cope, of a group of horizontally swinging arms mounted on said base at each side of the flask, said arms being normally out of the path of movement of the flask as it slides on said runways so as to afford ample clearance therefor, and means for swinging said arms into engagement with the cope and for then elevating them to lift the cope from the drag.

20. The combination with a base adapted to support a flask comprising the usual drag and cope, of a group of horizontally swinging arms mounted on said base at each side of the flask position, means for swinging said arms into engagement with the cope and for then elevating said arms so as to lift the cope from the drag, and means for moving said arms downwardly to lower the cope again and for swinging said arms to one side so as to provide a clear space between them for the removal of the flask from the base.

21. The combination with a flask comprising the usual drag, cope and pattern plate, of a slide rail disposed at each side of the flask, means for lifting the cope from the plate, and means for then elevating said slide rails whereby they are first brought into engagement with said plate and by a further movement lift the plate with them whereby said plate after being thus lifted may be withdrawn from said slide rails.

22. The combination with a flask comprising the usual drag and cope, of a pair of pivoted arms mounted adjacent thereto, means for swinging said arms into engagement with said cope and elevating said arms to lift the cope from the drag, means for locking the arms in cope-engaging position against further pivotal movement, and means for automatically releasing said lock when the arms and cope are again lowered.

23. The combination with a pair of arms mounted to swing in horizontal planes and spaced apart a distance greater than the combined length of said arms, of means for first swinging said arms into a position in which they extend toward each other, and then simultaneously elevating said arms.

24. The combination with a pair of arms mounted to swing in horizontal planes and spaced apart a distance greater than the combined length of said arms, of an operating shaft, and means actuated by the continued rotation of said shaft in the same direction for first swinging said arms around until they extend toward each other and then simultaneously elevating said arms.

In testimony whereof I affix my signature.

EUGENE MACON COLE.